United States Patent [19]

Mönch

[11] Patent Number: 5,630,628
[45] Date of Patent: May 20, 1997

[54] CONNECTING COUPLING

[75] Inventor: Heiner Mönch, Kenn, Germany

[73] Assignee: Ideal-Standard GmbH, Bonn, Germany

[21] Appl. No.: 446,682

[22] PCT Filed: Sep. 29, 1994

[86] PCT No.: PCT/DE94/01181

§ 371 Date: Jun. 1, 1995

§ 102(e) Date: Jun. 1, 1995

[87] PCT Pub. No.: WO95/10003

PCT Pub. Date: Apr. 13, 1995

[30] Foreign Application Priority Data

Oct. 1, 1993 [DE] Germany ............... 43 34 153.5

[51] Int. Cl.[6] ........................... F16L 35/00
[52] U.S. Cl. .................. 285/24; 285/305; 285/314; 285/321
[58] Field of Search ............... 285/305, 314, 285/321, 24, 319

[56] References Cited

U.S. PATENT DOCUMENTS 3,534,988 10/1970 Lindsey ..................... 285/305
3,698,747 10/1972 Gordon et al. .............. 285/305
4,244,608 1/1981 Stuemky .................... 285/305
5,209,523 5/1993 Godeau ..................... 285/305 X

FOREIGN PATENT DOCUMENTS 1527890 6/1968 France ...................... 285/305
5026385 2/1993 Japan ....................... 285/305
1303475 1/1973 United Kingdom ............ 285/305

Primary Examiner—Dave W. Arola
Attorney, Agent, or Firm—Michael J. Striker

[57] ABSTRACT

A connecting coupling has a hose nozzle and a coupling piece, for joining hose lines, and in particular for pressure-tight connection of the hose line of a dishwashing sprayer to a single-lever pillar mixer by means of plug-in connection. To further reduce manufacture costs and at the same time achieve a rapid and easily detachable connecting union, in the connecting coupling a retaining element is a disk-shaped body, split on one side, with a reinforced outer rim and with segment-like holding and blocking tongues that define a rectangular opening cross-section when the retaining element is closed. A coupling piece has a middle tube section with an end section, which can be inserted into the mixer, and the hose nozzle carries an O-ring on its end, secured by a bushing, and the bushing is locked by a retaining ring, to which is connected a plastic part with a retaining groove.

8 Claims, 3 Drawing Sheets

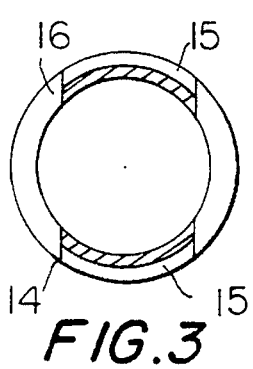
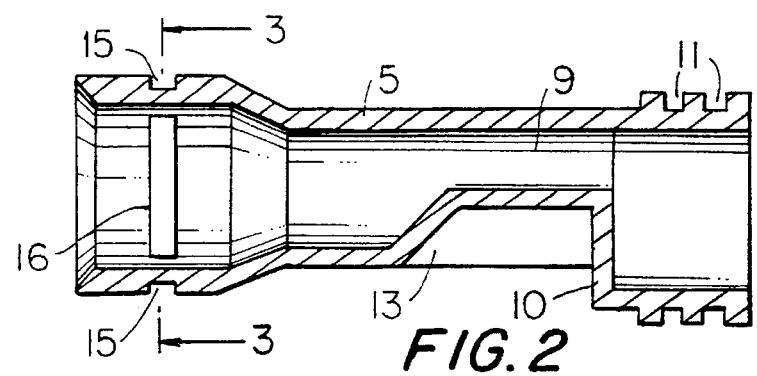
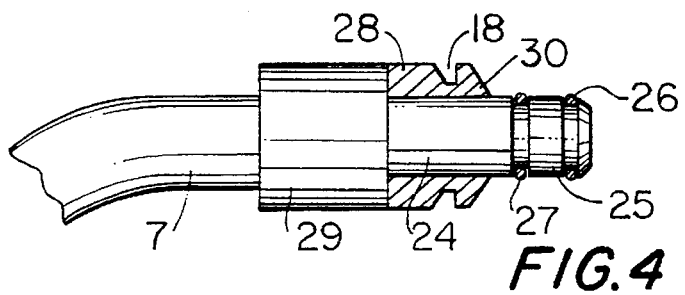
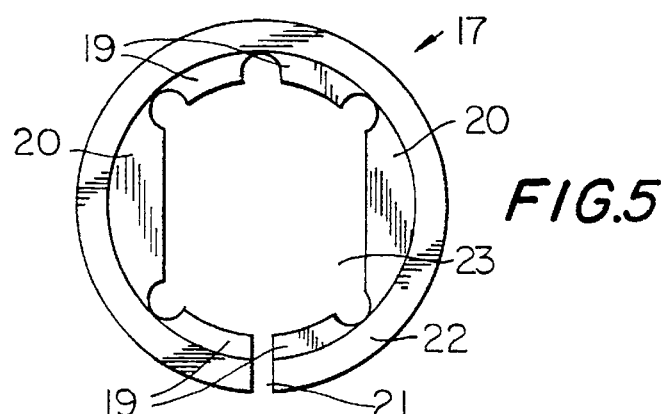
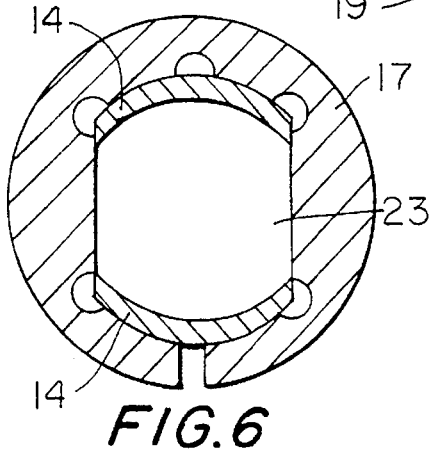
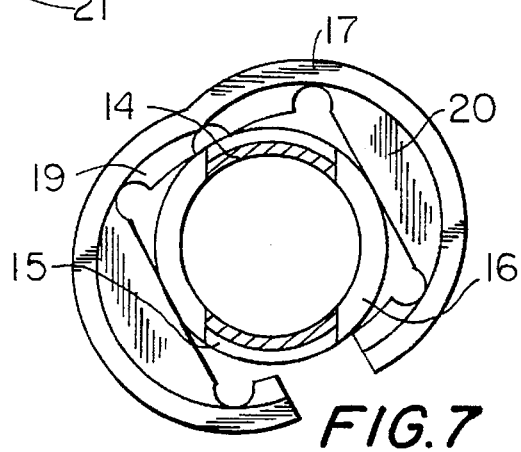

CONNECTING COUPLING

BACKGROUND OF THE INVENTION

The invention relates to a connecting coupling in several parts, comprising at least one nozzle and a coupling piece for joining hose lines together, in particular for the pressure-tight connection of the hose line of a dishwashing sprayer to a single-lever pillar mixer for a sink.

For reciprocally connecting hose lines or for rapidly and easily connecting a hose line to a faucet, couplings with a bayonet connector are already known, which comprise a hose nozzle, to be inserted into the hose line, and a coupling piece, which fits over the hose nozzle. The hose nozzle has a head part, which is enlarged in diameter, into which a seal is inserted in the face end, while the overlapping coupling piece contacts the rear face end of the head part. On its connecting face end, the coupling piece has two receiving grooves and two hook-shaped coupling pegs, which each engage in provided grooves of the coupling piece disposed on the hose line to be connected or on the faucet. The pressure-tight connection is produced by reciprocally aligned rotation of the coupling pieces; the hose nozzles inserted into the hose lines are pressed against each other and produce a pressure-tight connection by means of the seal disposed on face end. These bayonet couplings are embodied as very compact and are predominantly made of a metal, since the relatively high tensile and compression forces are received and transmitted by only the two coupling pegs. Bayonet couplings are relatively expensive in their manufacture and due to their compact embodiment, are not suited for all uses, such as when the axial spacing between the lines to be connected or joined is tight.

Another known connecting coupling manufactured of plastic material is likewise made in two parts. The hose socket to be inserted into the hose line to be connected has a cylindrical section with an O-ring inserted into a groove, at which a sealing stop cone connects to another cylindrical section that follows. This structural embodiment creates a shoulder, between the sealing cone and the cylindrical section that follows, over which are fitted retaining claws of the coupling piece, which are disposed on its face end. The coupling piece has a bore for receiving the cylindrical connecting section and the sealing cone of the hose nozzle and is provided with the above mentioned retaining claws on its coupling face end. Through the wedge action of a fitted, axially slidable actuating ring, which is prestressed by means of a spring, the elastically embodied, slightly resilient retaining claws are released in an open position, for plugging the hose nozzle into the coupling piece, and are locked in a closed position, in which they secure the pressure-tight connection with the help of the spring tension of the spring disposed in the actuating ring. This connecting coupling has a number of practical advantages. However, it is too complicated in its overall structural design, and as a result its production costs are too high. In an improvement of this above-described connecting coupling, the hose nozzle has only one cylindrical connecting section to be inserted into the coupling piece, and this section is provided with an O-ring disposed in a groove and a retaining groove disposed behind it. The coupling piece in turn has an actuating ring, which is prestressed by means of a spring and which can be disposed so that it can slide axially or rotate. To maintain a pressure-tight connection when the hose nozzle is plugged in, blocking wedges disposed in openings are provided, which engage the retaining groove of the hose nozzle and can be brought into an open or closed position by sliding or rotating the actuating ring. Despite the reduction in structural dimensions achieved, the structural design of this connecting coupling is still too complicated and its manufacture is too expensive.

SUMMARY OF THE INVENTION

The object of the invention, therefore, is to propose a further improved connecting coupling of the type mentioned at the beginning, which can be manufactured with the most minimal cost expenditure and which allows fast and easy connection or joining of hose lines.

In keeping with these objects and with others which will become apparent hereinafter, one feature of the present invention resides, briefly stated, in a connecting coupling having a nozzle with an end section insertable into a hose line and having an external retaining groove, and a coupling piece receiving the nozzle and connectable to a hose line or faucet fitting, wherein the coupling piece in its connecting region has external grooved sections and at least two slot-shaped openings, and an element secures the pressure-tight connection by penetrating the slot-shaped openings and locking into the retaining groove of the hose nozzle with positive fit, and the element is provided with holding and blocking tongues.

The proposed connecting coupling has an extremely simple and rational design while guaranteeing reliable function. Aside from a considerable reduction of material that must be used in manufacture, and of the work time to be expended, the space required for the connecting coupling is decisively reduced through the simple structural design. This advantage is particularly significant in connecting a hose line to a mixer of a faucet, where the available space is very limited anyway. In the event of repairs being carried out or for cleaning purposes, the sprayer for use in hand-washing or dishwashing, which is connected by means of the proposed connecting coupling, can rapidly be detached from the mixer and also rapidly reinstalled again.

In accordance with another feature of the present invention, the element is formed as an annular disk-shaped body split on one side and provided with a reinforced outer rim with holding and blocking tongues disposed in segment-like fashion so that when the element is closed there is a rectangular opening cross-section.

The element can be resilient and made of elastic plastic.

The coupling piece can have a needle tube section terminating in an end section insertable into a sink faucet, and the outer jacket of the tube end can be provided with grooves for receiving O-rings, with the tube section stabilized by an external connecting fin.

The hose section insertable into the coupling piece can have a cylindrical connecting section carrying an O-ring in a groove, and the ring can be secured by a slipped-on bushing locked by a retaining ring.

A plastic part can be fitted onto the connecting portion with the retaining groove. The plastic part can have a stop cone disposed on its face end and provided with a retaining groove.

The hose nozzle can have a cylindrical connecting section provided with grooves for receiving O-rings and connected to a stop cone, and a further cylindrical section with outer jacket fins defining a retaining groove.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a longitudinal section through the coupling piece in the shape of a connecting piece inserted into the-sink faucet;

FIG. 3 shows the section A—A from FIG. 2;

FIG. 4 shows a hose line with a hose nozzle according to a first embodiment;

FIG. 5 shows the annular disk-shaped element, which secures the connecting union;

FIG. 6 shows the connecting union secured by means of the annular disk-shaped element;

FIG. 7 shows the insertion of the retaining element into the put-together coupling parts of the connecting coupling;

DESCRIPTION OF THE PREFERRED EMBODIMENTS

Figure 1:
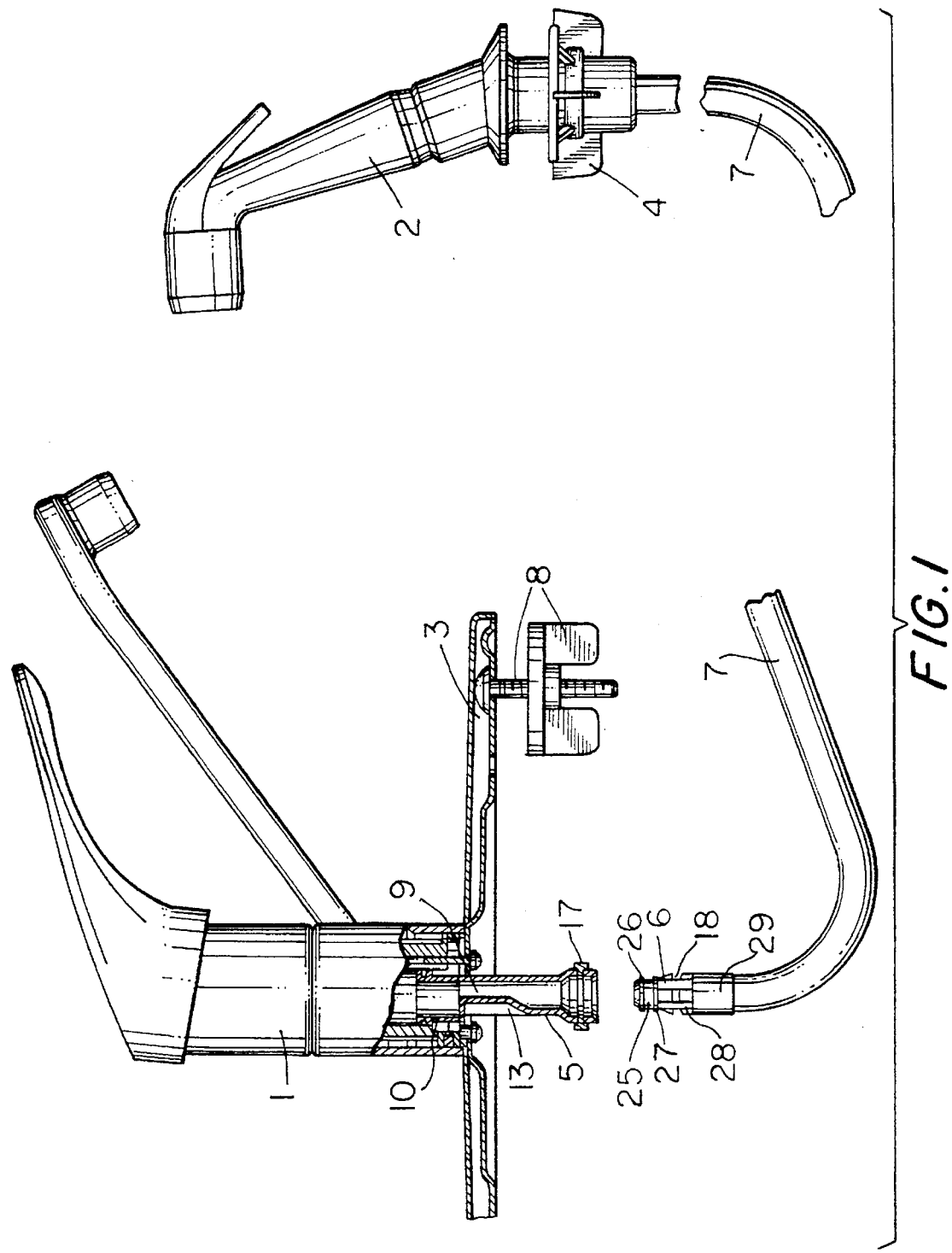
FIG. 1 shows a single-lever pillar mixer with a dishwashing sprayer connected to the sink faucet using the connecting coupling according to the invention.

The dishwashing sprayer 2 shown in FIG. 1 is disposed in a separate receptacle 4 and is connected via the hose line 7 with a single-lever pillar mixer 1. The sink faucet 1 is connected to a sink, not shown, by means of the base plate 3 and the screws 8. To connect the hose line 7 for the dishwashing sprayer 2, a coupling piece 5 in the form of a tube section 9 is sealingly inserted in the housing of the sink faucet 1. To manufacture the connecting union and to secure the hose nozzle inserted into the coupling piece 5, the connection region 14 of the coupling piece 5 has external groove sections 15—FIGS. 2 and 3—and at least two slot-shaped openings 16, which permeate the wall of the coupling piece 5. The opposing end section 10 of the coupling piece 5 embodied as a connecting piece is provided with grooves 11 to receive O-rings. Between the connecting region 14 and the end section 10 is disposed a tube section 9 and an external connecting fin 13, by means of which the coupling piece embodied as a connecting piece is stabilized as a whole. The hose nozzle 6 to be plugged into the coupling piece 5 is inserted into the hose line 7 and fastened with the help of the annular cuff 29. The hose nozzle 6 has a cylindrical connecting section 24—FIG. 4—, which is provided with an O-ring disposed in a groove and secured by a bushing 25, which is plugged on. The bushing 25 in turn is locked by means of a retaining ring 27. A plastic part 28, which is fitted onto the connecting section 24, is connected to the retaining ring 27 and is provided with a retaining groove 18 and a stop cone 30.

To maintain the pressure-tight connecting union between the coupling piece 5 and the plugged-in hose nozzle 6, the retaining element 17 shown in FIG. 5 is fitted onto the coupling piece 5, and the holding tabs 19 are pressed into the external annular groove 15 by a compression force to be exerted by hand and the blocking tongues 20 are pressed into the slot-shaped openings 16; the tabs 20, penetrating the openings, lock into the retaining groove 8 of the hose nozzle 6 as a result of the resilient embodiment of the element 17, with both positive and nonpositive engagement. FIG. 7 shows the process of sliding on and inserting the retaining element 17. FIG. 6 shows the inserted retaining element 17, with which the hose nozzle 6 and the coupling piece 5 are connected to each other.

Figure 8:
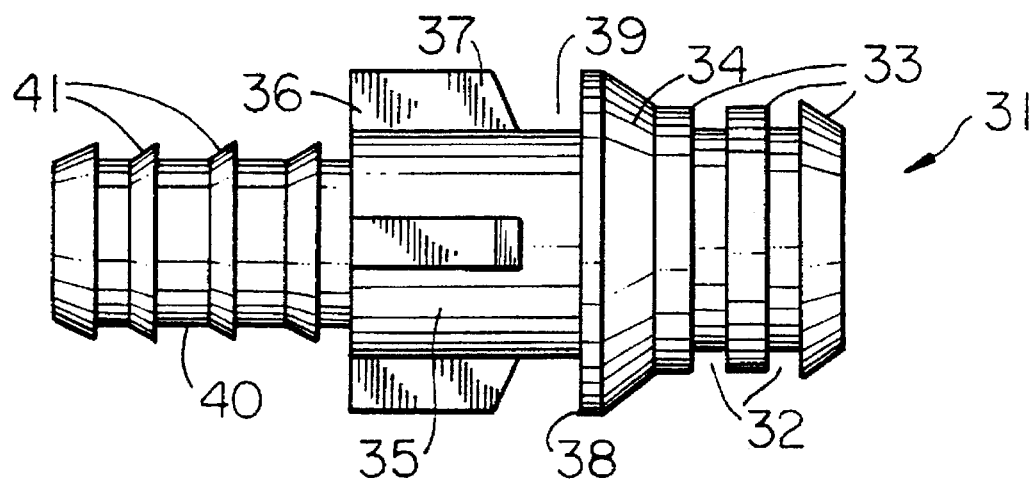
FIG. 8 shows a second embodiment form of the hose nozzle.
Figure 9:
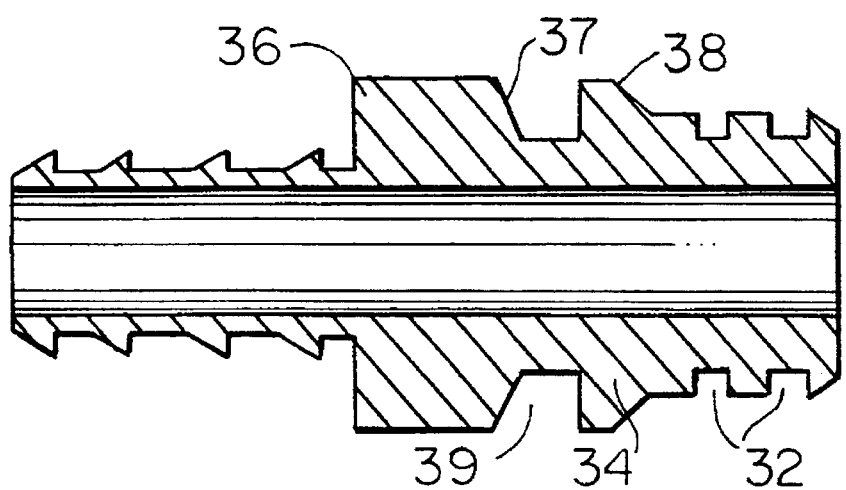
FIG. 9 shows the longitudinal section through the nozzle according to FIG. 8.

The retaining element 17 shown in FIG. 5 is preferably an annular disk-shaped elastic body, which can be widened by means of the dividing slit 21 made in it, and which is provided with a reinforced outer rim 22. The aforementioned blocking tongues 20 and the holding tabs 19 are disposed in segment-like fashion inside the annular disk-shaped retaining element 17; the holding tabs 19 and the blocking tongues 20 are embodied in relation to the outer rim so that when the retaining element 17 is closed, there is a rectangular opening cross section 23. The retaining element 17 is preferably made of an elastic plastic and is in a position to receive and reliably transmit the compression and tensile forces occurring at the coupling point. Additional cost savings can be achieved through the further simplified hose nozzle 31 shown in FIGS. 8 and 9. The hose nozzle 31, preferably embodied as a plastic part, has a cylindrical connecting section 33, which is provided with grooves 32 for receiving O-rings, to which is connected the stop cone 34 with the following cylindrical section 35. Fins 36 are provided on the cylindrical section 35, whose face ends 37, together with the back end of the stop cone 34, which forms a shoulder 38, define the retaining groove 39, in which the blocking tongues of the retaining element 17 engage. The end section 40 of the hose nozzle 31 is provided with ribs 41, which support the secure fastening of the hose nozzle in a hose line in a known manner.

It will be understood that each of the elements described above, or two or more together, may also find a useful application in other types of constructions differing from the types described above.

While the invention has been illustrated and described as embodied in a connecting coupling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

List of Reference Numerals
1 single-lever pillar mixer
2 dishwashing sprayer
3 base plate
4 receptacle
5 coupling piece
6 hose nozzle
7 hose line
8 fastening screws
9 tube section
10 end section
11 grooves
12
13 connecting fin
14 connecting region
15 external groove section
16 slot-shaped opening
17 retaining element
18 retaining groove
19 holding tabs
20 blocking tongues 21 parting slit
22 outer rim
23 opening cross section
24 connecting section
25 bushing
26 O-ring
27 retaining ring
28 plastic part
29 annular cuff
30 stop cone
31 hose nozzle
32 grooves
33 connecting section
34 stop cone
35 cylindrical section
36 fin
37 face ends
38 shoulder
39 retaining groove
40 end section
41 ribs

What is claimed as new and desired to be protected by Letters Patent is set forth in the appended claims:

1. A connecting coupling, comprising a nozzle having an end section insertable into a hose line and a connection section including an external retaining groove; a coupling piece connectable to a hose line or faucet fitting and having an inner contour corresponding to an outer contour of said nozzle connection section so as to receive said nozzle connection section, said coupling piece having a connecting region provided with external grooved sections and at least two slot-shaped openings; and an element penetrating said slot-shaped openings of said couplings piece so as to lock in said retaining groove of said nozzle connection section with positive fit, said securing element being provided with holding and blocking tongues for maintaining a connection between said nozzle connection section and said coupling piece, said securing element being a disk-shaped body with a central opening therethrough and which is split on one side and is provided with a reinforced outer rim, said holding and blocking tongues engaging in said slot-shaped openings and said retaining groove and being formed and arranged relative to said reinforced outer rim so that when said securing element is closed, said central opening forms a substantially rectangular opening.

2. A connecting coupling as defined in claim 1 and further comprising an O-ring carried on said nozzle connection section.

3. A connecting coupling as defined in claim 1, wherein said securing element is resilient and composed of an elastic plastic.

4. A connecting coupling as defined in claim 1, wherein said coupling piece has a middle tube section which terminates in an end section insertable into a sink faucet, said end section having an outer surface provided with grooves for receiving O-rings, said middle tube section being provided with an external connecting fin for stabilization of said middle tube section.

5. A connecting coupling as defined in claim 1, wherein said nozzle connecting section connection section is cylindrical and has a groove and is insertable into said coupling piece; and further comprising an O-ring carried on an end of said cylindrical connecting section; a slipped-on bushing securing said O-ring in said groove; a retaining ring locking said bushing; and a plastic part connected to said retaining ring and fitted onto said connecting section with said retaining groove.

6. A connecting coupling as defined in claim 5, wherein said plastic part has a stop cone provided on an end face of said plastic part, said retaining groove encompassing said stop cone.

7. A connecting coupling as defined in claim 1, wherein said nozzle connecting section is cylindrical and is provided with grooves for receiving O-rings, a stop cone connected with said cylindrical connecting section and having a back end shoulder, and a further cylindrical section provided with outer jacket fins having face ends, said face ends of said fins and said back end shoulder of said stop cone defining said retaining groove.

8. A connecting coupling as defined in claim 1, wherein said holding and blocking tongues are segment-shaped.

* * * * *